US009713147B2

(12) United States Patent
Schmidt et al.

(10) Patent No.: US 9,713,147 B2
(45) Date of Patent: Jul. 18, 2017

(54) LICENSE SHARED ACCESS IN CELLULAR NETWORK

(71) Applicant: Intel Corporation, Santa Clara, CA (US)

(72) Inventors: Andreas Schmidt, Braunschweig (DE); Markus Dominik Mueck, Neubiberg (DE)

(73) Assignee: Intel Corporation, Santa Clara, CA (US)

( * ) Notice: Subject to any disclaimer, the term of this patent is extended or adjusted under 35 U.S.C. 154(b) by 263 days.

(21) Appl. No.: 14/136,755

(22) Filed: Dec. 20, 2013

(65) Prior Publication Data

US 2015/0181601 A1 Jun. 25, 2015

(51) Int. Cl.
| | |
|---|---|
| *H04W 16/14* | (2009.01) |
| *H04W 72/04* | (2009.01) |
| *H04W 12/08* | (2009.01) |
| *H04L 5/00* | (2006.01) |

(52) U.S. Cl.
CPC ......... *H04W 72/0453* (2013.01); *H04L 5/001* (2013.01); *H04W 12/08* (2013.01); *H04W 16/14* (2013.01); *H04L 5/003* (2013.01)

(58) Field of Classification Search
None
See application file for complete search history.

(56) References Cited

U.S. PATENT DOCUMENTS

| | | | | |
|---|---|---|---|---|
| 2010/0145862 | A1* | 6/2010 | Chang | G06Q 30/08 705/80 |
| 2012/0120887 | A1* | 5/2012 | Deaton | H04W 16/14 370/329 |
| 2013/0322371 | A1 | 12/2013 | Prakash et al. | |
| 2013/0337821 | A1* | 12/2013 | Clegg | H04L 5/0062 455/452.1 |

(Continued)

FOREIGN PATENT DOCUMENTS

| | | |
|---|---|---|
| CN | 105745859 A | 7/2016 |
| WO | WO-2012109195 A2 | 8/2012 |

OTHER PUBLICATIONS

"Cloud Spectrum Services (CSS)", Intel Corporation Information paper submitted to ETSI TC RRS, (May 2012), 13 pgs.

(Continued)

*Primary Examiner* — Fan Ng
(74) *Attorney, Agent, or Firm* — Schwegman Lundberg & Woessner, P.A.

(57) ABSTRACT

Generally discussed herein are systems and apparatuses that are configured for using Licensed Shared Access (LSA) in a cellular network. Also discussed herein are method of using the systems and apparatuses. In one or more embodiments, an LSA control can include a processor configured to determine which licensing option of a plurality of licensing options to accept, and the LSA control can include a transceiver configured to (1) receive a first signal representative of a request for extra spectrum from a licensing Base Station (BS), and transmit a second signal representative of (Continued)

one or more details of the accepted licensing option to the licensee BS and an incumbent BS so as to cause the licensee BS to use the extra spectrum and cause the incumbent BS to stop using the extra spectrum in a coverage area of the licensee BS.

19 Claims, 12 Drawing Sheets

(56) References Cited

U.S. PATENT DOCUMENTS

| | | | | | |
|---|---|---|---|---|---|
| 2014/0357218 | A1* | 12/2014 | Andrianov | .............. | H04W 4/24 455/406 |
| 2015/0111596 | A1* | 4/2015 | Ruuska | ................. | H04W 16/14 455/454 |
| 2015/0230098 | A1* | 8/2015 | Li | ......................... | H04W 16/10 455/454 |
| 2015/0304853 | A1* | 10/2015 | Murray | .............. | H04W 76/068 455/454 |

OTHER PUBLICATIONS

"Cloud Sprectrum Services (CSS) Presentation", Intel Corporation to ETSI RRS, (Feb. 2012), 24 pgs.

"Current ETSI RRS activities of relevance to the revision of the R&TTE Directive and the future EC RRS standardization Mandate", Workshop on Cognitive Radio and Software Defined Radio: Policy and Regulations, Mainz, Germany, (May 3, 2012), 10 pgs.

"International Application Serial No. PCT/EP2014/003463, International Search Report mailed May 12, 2015", 5 pgs.

"International Application Serial No. PCT/EP2014/003463, Invitation to Pay Additional Fees and Partial Search Report mailed Mar. 6, 2015", 6 pgs.

"International Application Serial No. PCT/EP2014/003463, Written Opinion mailed May 12, 2015", 9 pgs.

"New Work Item (NWI) to develop a System Reference Document (SRDoc) for mobile broadband services in the 2300-2400 MHz band under Licensed Shared Access regime", Nokia, Nokia Siemens Networks, Huawei Technologies, Qualcomm, Intel, InterDigital RRS(12)018018, (May 3, 2012), 4 pgs.

"Physical Channels and Modulation", 3GPP TS 36.211 V11.2.0(Release 11), (Feb. 2013), 109 pgs.

"Proposal on CRS Deployment Scenario—Cloud Spectrum Services (CSS)", Intel Corporation, ASIA-Pacific Telecommunity the 13th Meeting of the APT Wireless Group (AWG-13), (Sep. 2012), 1 pg.

"Report on Collective Use of Spectrum (CUS) and other spectrum sharing approaches", Radio Spectrum Policy Group-RSPG11-392, (Nov. 2011), 38 pgs.

"Report on Study of the ASA concept", FM(12)084 Annex 47 CEPT WG FM,, (2012), 11 pgs.

"User Equipment (UE) radio transmission and reception", 3GPP TS 36.101 V11.4.0 (Release 11), (Mar. 2013), 402 pgs.

"International Application Serial No. PCT/EP2014/003463, International Preliminary Report on Patentability mailed Jun. 30, 2016", 12 pgs.

* cited by examiner

700

| INFORMATION ELEMENT | DESCRIPTION |
|---|---|
| MESSAGE TYPE | IDENTIFY MESSAGE AS SPECTRUM REQUEST |
| TRANSACTION ID | EXPRESSES RELATION BETWEEN REQUEST/RESPONSE MESSAGE PAIRS |
| PROTOCOL VERSION | VERSION NUMBER OF THE PROTOCOL USED BY THE SENDING ENTITY |
| PLMN IDENTIFIER | PLMN IDENTIFIER (E.G., MCC AND MNC OF TS24.301) |
| MNO ID | DESCRIBES LICENSEE |
| BANDWIDTH | DESCRIBES LICENSEE BANDWIDTH DEMAND |
| PREFERRED CARRIER FREQUENCY | DESCRIBES LSA FREQUENCY REQUIREMENTS |
| CELL NETWORK CONFIGURATION | DESCRIBES CURRENT LTE CONFIGURATION IN THE RESPECTIVE LICENSEE LOCATION |
| AREA | SPECIFIES LOCATION OR COVERAGE AREA THAT REQUEST PERTAINS TO |
| RAN ELEMENT IDENTIFIERS | LIST OF AFFECTED BASE STATIONS, RADIO CELLS, OR OTHER NW EQUIPMENT |

| INFORMATION ELEMENT | DESCRIPTION |
|---|---|
| MESSAGE TYPE | IDENTIFY MESSAGE AS SPECTRUM GRANT/RESPONSE |
| TRANSACTION ID | EXPRESSES RELATION BETWEEN REQUEST/RESPONSE MESSAGE PAIRS |
| PROTOCOL VERSION | VERSION NUMBER OF THE PROTOCOL USED BY THE SENDING ENTITY |
| RECONFIGURATION IDENTIFIER | IDENTIFIER OF RECONFIGURATION OPERATION |
| BANDWIDTH | DESCRIBES LICENSED BANDWIDTH |
| CARRIER FREQUENCY | DESCRIBES LICENSED FREQUENCY |
| MAX TX POWER | DESCRIBES MAXIMUM ALLOWABLE TRANSMISSION POWER |
| CARRIER AGGREGATION SETTINGS | DESCRIBES COMPONENT CARRIER CONFIGURATION |
| RAN ELEMENT IDENTIFIERS | LIST OF AFFECTED BASE STATIONS, RADIO CELLS, OR OTHER NW EQUIPMENT |
| DUPLEX MODE SETTINGS | DUPLEX MODE CONFIGURATION (E.G., FDD OR TDD) |
| AREA | SPECIFIES LOCATION OR COVERAGE AREA THAT GRANT PERTAINS TO |
| TIMING RESTRICTIONS | TIME WINDOW IN WHICH NEW SPECTRUM ALLOCATION IS VALID |
| STATUS CODE | DETAILS REGARDING PROCESSING OF PREVIOUS REQUEST |

| INFORMATION ELEMENT | DESCRIPTION |
|---|---|
| MESSAGE TYPE | IDENTIFY MESSAGE AS SPECTRUM RETURN INDICATION |
| TRANSACTION ID | EXPRESSES RELATION BETWEEN INDICATION/CONFIRMATION MESSAGE PAIRS |
| PROTOCOL VERSION | VERSION NUMBER OF THE PROTOCOL USED BY THE SENDING ENTITY |
| PLMN IDENTIFIER | PLMN IDENTIFIER (E.G., MCC AND MNC OF TS24.301) |
| MNO IDENTIFIER | DESCRIBES LICENSEE |
| RECONFIGURATION IDENTIFIER | IDENTIFIES SPECTRUM THAT IS TO BE RELEASED |
| BANDWIDTH | DESCRIBES BANDWIDTH TO RELEASE |
| CARRIER FREQUENCY | DESCRIBES FREQUENCY TO RELEASE |
| RAN ELEMENT IDENTIFIERS | LIST OF AFFECTED BASE STATIONS, RADIO CELLS, OR OTHER NW EQUIPMENT |
| AREA | SPECIFIES LOCATION OR COVERAGE AREA THAT GRANT PERTAINS TO |

*FIG. 10*

| INFORMATION ELEMENT | DESCRIPTION |
|---|---|
| MESSAGE TYPE | IDENTIFY MESSAGE AS SPECTRUM RETURN CONFIRMATION |
| TRANSACTION ID | EXPRESSES RELATION BETWEEN INDICATION/CONFIRMATION MESSAGE PAIRS |
| PROTOCOL VERSION | VERSION NUMBER OF THE PROTOCOL USED BY THE SENDING ENTITY |
| CONFIRMATION | ACK/NACK FOR SUCCESSFUL RECEPTION OF THE SPECTRUM RETURN INDICATION MESSAGE |
| STATUS CODE | DETAILS ABOUT PROCESSING THE INDICATION SENT PREVIOUSLY |

FIG. 11

LICENSE SHARED ACCESS IN CELLULAR NETWORK

TECHNICAL FIELD

Examples generally relate to frequency allocation in a cellular network. One or more examples relates to system configuration for License Shared Access (LSA) in a Long Term Evolution (LTE) network.

TECHNICAL BACKGROUND

Cellular networks, such as Long Term Evolution (LTE), can allow a device to connect to or communicate with other devices. Modern LTE networks can include both large and small cells configured in a Heterogeneous Network (HetNet) configuration. The base stations (e.g. Enhanced Node Bs (eNodeBs)) of large and small cells can be configured to operate on different frequency bands.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 7 shows an example of information elements that can be included in a "SPECTRUM REQUEST".

FIG. 8 shows an example of information elements that can be included in a "SPECTRUM GRANT".

FIG. 10 shows an example of information elements that can be included in a "SPECTRUM RETURN INDICATION".

FIG. 11 shows an example of information elements that can be included in a "SPECTRUM RETURN CONFIRMATION.

DESCRIPTION OF EMBODIMENTS

Figure 1:
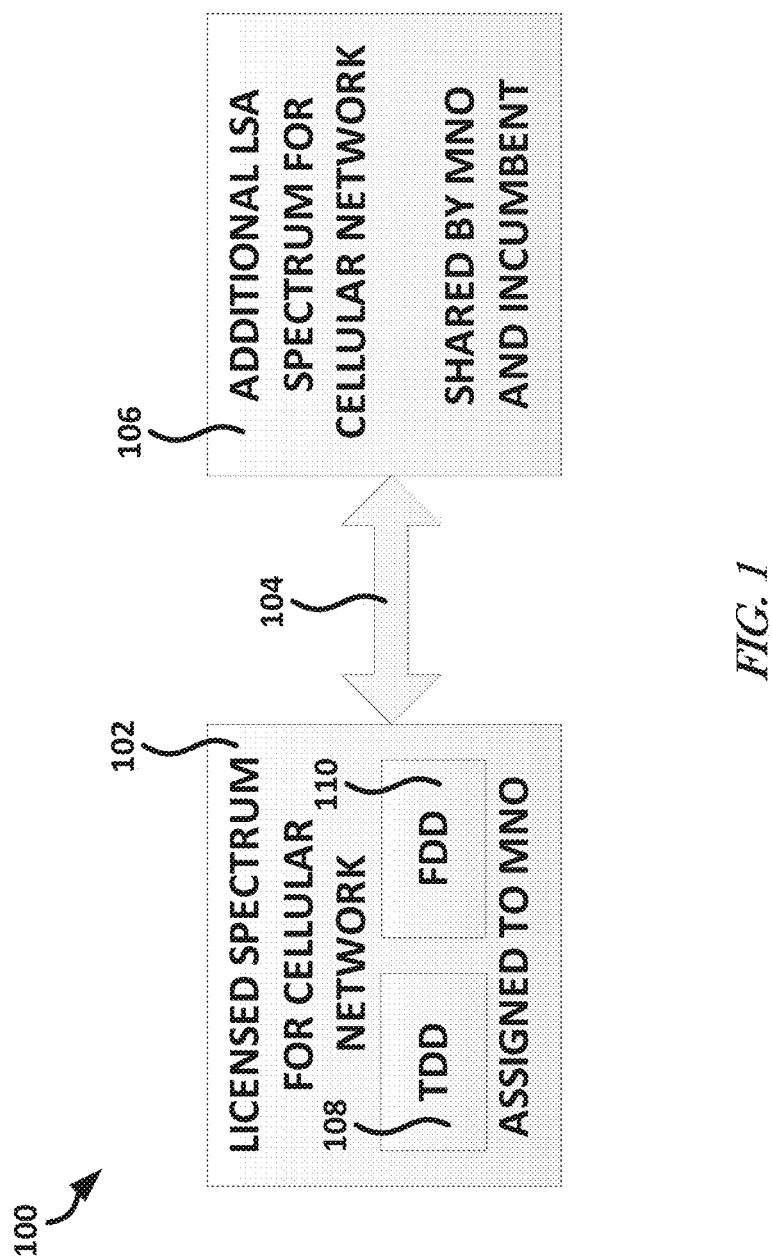
FIG. 1 shows an example of a frequency handover from an LSA to a cellular network.

The Licensed Shared Access (LSA) concept was developed by Radio Spectrum Policy Group (RSPG). The objective was to propose a way to allow a cellular network operator access to more spectrum (e.g., bandwidth, such as different frequency bands to communicate on). It is expected that the available amount of new dedicated spectrum for cellular operators for mobile communications will not be sufficient to meet demand in the future. LSA offers a mechanism for introducing shared spectrum based solutions, such as by giving mobile cellular operators access to additional licensed spectrum from other licensees (like public safety, government, or other licensees of the spectrum) which the operators would not normally get access to.

Two duplex flavors of LTE currently exist, namely Time Division Duplexing (TDD) and Frequency Division Duplexing (FDD). From Third Generation Partnership Project (3GPP) Rel-10 onwards, LTE may include Carrier Aggregation (CA) technology. LTE could be operated in the LSA frequency bands instead of or in addition to operation of LTE in the legacy licensed LTE frequency bands, such as if the incumbent (e.g., the licensee) is not disturbed by LTE operating on the licensed frequency band. Systems, apparatuses, and methods for implementing LSA in a cellular network, such as LTE, are discussed herein. Handover methods between legacy licensed LTE bands and upcoming LSA LTE bands are discussed herein. This disclosure also pertains to non-cellular systems, such as Wireless Fidelity (WiFi) or TeleVision White Space (TVWS) systems, or the like.

LSA is based on a similar solution introduced by Qualcomm and NOKIA which is called ASA (Authorized Shared Access). ASA, however, is limited to International Mobile Telecommunication (IMT) spectrum while LSA addresses non-IMT bands and IMT bands.

INTEL has recently introduced a related technology which is called Cloud Spectrum Services (CSS). The CSS is a similar framework as LSA and ASA, but introduces more detailed implementation solutions.

On a regulatory level, there is interest in LSA/ASA/CSS, in particular in Europe. The Commission of European Postal and Telecommunications (CEPT) Working Group (WG) Frequency Management (FM) agreed to launch a corresponding project team in September-2012. European Telecommunications Standards Institute (ETSI) has agreed on the set-up of a so-called System Reference Document (SR-Doc) in May-2012, which is the official way for ETSI to cooperate with regulatory bodies. This document allows industry to officially provide inputs and requirements related to CEPT work on LSA/ASA/CSS.

This SRDoc targets in particular the 2.3-2.4 GHz Band which is expected to be one of the most straightforward candidates for shared spectrum usage. This is also acknowledged by the CEPT WG FM. Also, the Federal Communications Coalition (FCC) has suggested that the 3550-3650 MHz band is a candidate for LSA.

While the LSA/ASA/CSS framework is originally designed to manage frequency licensing from non-mobile incumbents to Mobile Network Operators (MNOs), this disclosure proposes solutions for adapting and using the LSA/ASA/CSS infrastructure for intra-MNO management of frequency allocation within a cellular network, such as 3GPP HetNets. The cellular network architectures can include various Base Station (BS) categories (such as a primary, secondary, macro, micro, pico, or femto BS), cell size types (such as macro, large, small, micro, pico, or femto cell type), Carrier Aggregation (CA) configurations, or LTE duplex methods, such as TDD or FDD. In particular, the proposed approaches will allow to dynamically (re-)allocate spectrum to the most optimum BS type such that an increased (e.g., optimum) usage of spectrum resources within a cellular network is achieved.

The bidirectional handover case between LTE operated in LSA bands and LTE operated in the legacy licensed frequency bands, such as when a bunch of component carriers are used in LTE as part of CA, can be of interest in this disclosure, because unlike in the legacy intra-LTE handover scenarios the MNO's usage rights of resources in the LSA bands can vary over time:

In the framework of the present disclosure, we mainly address LSA usage in combination with LTE TDD, since the current focus in CEPT, ETSI, etc. is on introducing LSA for a specific 2.3-2.4 GHz band (LTE Band 40), which is a TDD band. The current CEPT, ETSI activities thus target a solution that allows LTE usage in the specific band 40 (2.3-2.4 GHz) with LTE being a secondary system in this band and with other primary systems co-existing. In China, for example, LSA is not required in band 40, since this band is exclusively licensed to LTE operators and thus no co-existence mechanisms need to be introduced. In general, however, LSA is applicable to both FDD and TDD.

This disclosure shows how to select (e.g., efficiently) a Carrier Aggregation (CA) based bundle of LTE UpLink (UL)/DownLink (DL) FDD channels once the operation of LSA TDD is terminated. And vice versa, solutions for a better parameterization of LSA TDD usage is proposed once a Carrier Aggregation (CA) based bundle of LTE UL/DL FDD channels is to be handed over to the LSA TDD band. Here, LSA usage is limited to LTE TDD since this is the current focus in CEPT and ETSI activities for 2.3-2.4 GHz in Europe. As stated above, in future, or in other regions LSA can be applied to FDD, TDD, or a combination thereof.

This disclosure discusses how to adapt the LSA system approach such that it can efficiently handle frequency re-allocation in a cellular network, such as by adapting the LSA such that it can be used for an intra-operator (e.g., MNO) spectrum. This disclosure also discusses how to parameterize (e.g., efficiently) LSA applying LTE TDD when either i) LSA applying LTE TDD is added to an LTE FDD configuration, or ii) an LTE FDD configuration is handed over to LSA applying LTE TDD, or iii) LSA applying LTE TDD is added to a combination of LTE TDD and FDD in licensed bands. This disclosure further discusses how to parameterize (e.g., efficiently) licensed band LTE FDD or LTE TDD based on CA applying a combination of LTE UL/DL FDD or LTE TDD channels when an LSA configuration is (e.g., partly) terminated and handed over to licensed band LTE FDD or LTE TDD channels. This disclosure considers how to account for asymmetric traffic characteristics (e.g., more DL traffic than UL traffic) that may arise with CA.

FIG. 1 depicts an example of a system 100 that includes a legacy band 102 receiving spectrum from or returning spectrum to, at arrow 104, an additional LSA spectrum band 106. The legacy band 102 can include a TDD band 108 or an FDD band 110. The additional spectrum from the additional LSA spectrum band 106 can be TDD or FDD bands.

Figure 2:
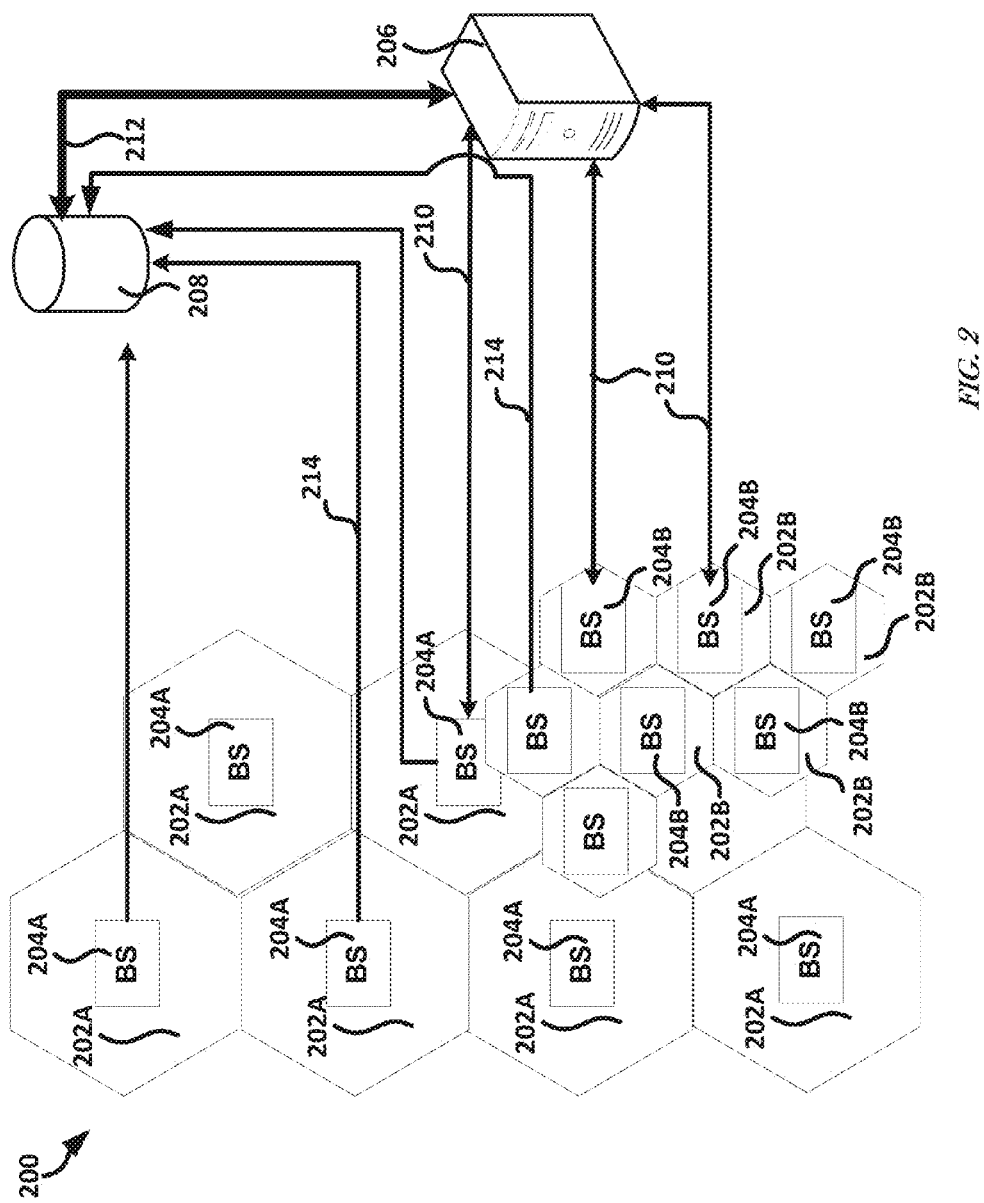
FIG. 2 shows an example of a cellular network system.

FIG. 2 shows an example of a cellular network system 200 configured to perform LSA. The system 200 can include large BS 204A with corresponding large cells 202A. The system can include small BS 204B with corresponding small cells 202B. The small cell 202B can be entirely within or at least partially overlap with a large cell 202A or another small cell 202B. The system 200 can include an LSA controller 206 and an LSA database 208.

The LSA controller 206 can be communicatively coupled to the large BS 204A and the small BS 204B, such as through communication line 210. The communication line 210 can create a wired or wireless coupling. The LSA controller 206 can be communicatively coupled to the LSA database 208, such as through communication line 212. The communication line 212 can create a wired or wireless coupling.

The small BS 204B can be a micro, pico, femto, or other BS with a smaller transmission range than the large BS 204A. The large BS 204A can be a macro BS. The large BS 204A and small BS 204B can be enhanced Node B (eNodeB) base stations. Other access technologies can be used in the system 200, such as access technologies controlled by an operator (e.g., an MNO), for example WiFi (IEEE 802.11a/b/g/n/ac/ad), WiFi for Television White Space (TVWS) (IEEE 802.11af), WiMAX (IEEE 802.16e/m), Bluetooth, mmWave technology, or the like.

In the following disclosure, the large BS 204A is assumed to play the role of the classical "LSA incumbents" (e.g., the large BS 204A may grant leased spectrum to other BS types (such as small BS 204B) for a given period of time, or within a given geographic area. In general, the role of the incumbent is not limited to the large BS 204A. Also, other BS types, such as micro-, pico-, femto-BS, or the like, may be able to grant leased spectrum to other BS types, including macro-, micro-, pico-, femto-BS. In addition, spectrum leasing between distinct heterogeneous access technologies is possible, such as distinct operator-controlled technologies. For example, an operator-controlled WiMAX BS may play the role of the classical LSA incumbent and grant spectrum to other NetWork (NW) equipment operating in this frequency band.

In legacy systems, the spectrum carrier frequency allocation to all cells (and all cell types, large and small) can be done in the network planning stage and thus the frequency allocation can be fixed and time invariant. The bandwidth allocation to a cell is typically static, even though it can be done dynamically, such as by the operator.

Figure 3:
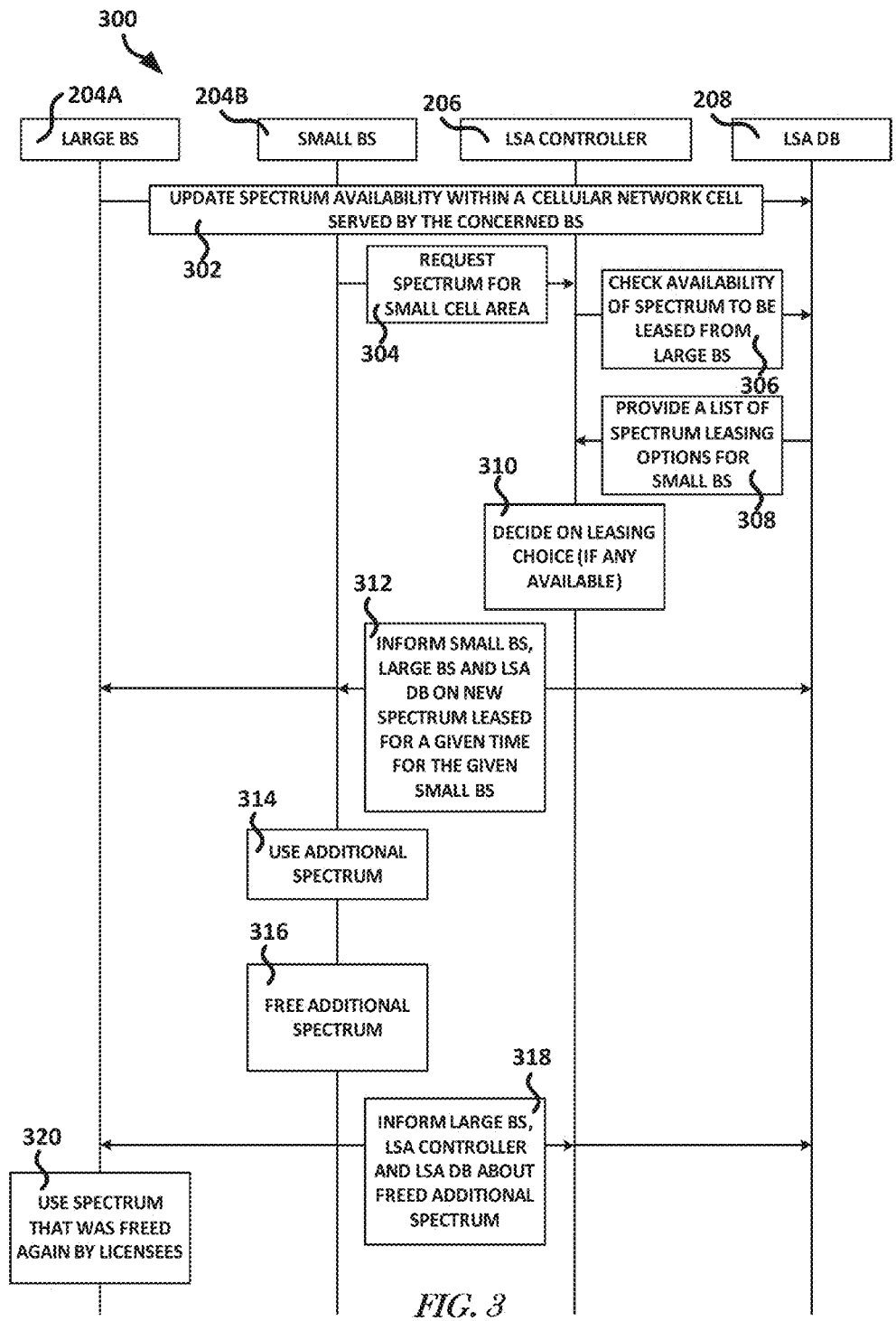
FIG. 3 shows an example of a flow diagram of a technique for frequency allocation in a cellular network.

FIG. 3 shows an example of a technique 300 for performing LSA within a cellular network. Note that FIG. 3 concerns leasing spectrum from the large BS 204A to the small cell 204B (e.g., the BSs at least partially within the coverage area of the large BS 204A). Also, note that the usage of large BS 204A as the classical "LSA incumbent" and the usage of the small BS 204B as the classical "LSA licensee" are only examples and the roles of the large BS 204A and the small BS 204B can be reversed. Other NW access equipment, cell types, and other technologies may be used instead and the roles of these can be either the incumbent or the licensee.

At 302, the NW equipment (e.g., the large BS 104A) that is taking the role of the classical LSA incumbent and able to grant LSA spectrum leasing to other BS types (or other NW equipment technologies) can provide information of possible spectrum leasing to the LSA database 208. The NW equipment can also provide information regarding the usage or traffic load on their spectrum to the LSA database 208. This information may alternatively or additionally originate from central frequency planning performed by the operator or other source. Information originating from (distributed) sensing, such as distributed mobile device centric sensing, can be used to derive a corresponding spectrum leasing candidate band in a given area or at a given time, and in a given spectrum band.

In case a BS (e.g., a BS that overlaps with another cell type that is possibly offering spectrum for leasing) needs more spectrum (e.g., due to a local or time-limited increase of device (e.g., User Equipment (UE) demand), the concerned NW equipment (e.g., the small BS 204B) can contact the LSA controller 206 to request more spectrum, such as at 304. The request can be for a given geographic area, a given time, or with a preference for a specific spectrum band. At 306, the LSA controller 206 can determine if the requested spectrum is available, such as through a request to the LSA database 208.

At 308, the LSA database 208 can respond to the request from the LSA controller 206 with a list of zero or more leasing options for the requesting NW equipment (e.g., the small BS 204B in the example of FIG. 3). At 310, the LSA controller 310 can decide which leasing choice (if any or multiple leasing choices are available) will be used. Alternatively, the requesting or leasing NW equipment (e.g., the large BS 204A or small BS 204B) can decide which leasing option to implement. In such a case, the LSA controller 206 or the LSA database 206 can inform the NW equipment which leasing options are available.

If spectrum, such as the preferred spectrum, can be leased from one cell type to another for the requested geographic area or for the requested time, the LSA controller 206 can inform a concerned NW equipment (e.g., large BS 204A or small BS 204B) about the spectrum leasing possibility. If a modified configuration is available (e.g., a different configuration from the original configuration requested by the NW equipment licensee), the LSA controller 206 can propose the modified configuration to the concerned BS and wait for a final approval. At 312, the LSA controller 206 can inform the relevant NW equipment (e.g., the small BS 204B, large BS 204A, and the LSA database 208 in the example of FIG. 3) what the time, geographic area, or spectrum band details of the lease are.

At 314, the NW equipment (e.g., small cell 204B in the example of FIG. 3) which is leasing spectrum can operate with the additional spectrum. At or around the time the leasing license expires, the NW equipment licensee can perform a Hand Over (H/O) of its devices (e.g., UE or other cellular network capable devices) such that the LSA leased spectrum is vacated or freed, such as at 316. The operation of the LSA leased spectrum can be terminated and the spectrum can be given back to the NW equipment incumbent (e.g., the large BS 204A in the example of FIG. 3). At 318, the small BS 204B (or other NW equipment that is the licensee) can inform the NW equipment involved with the lease (e.g., the incumbent large BS 204A, the LSA controller 206, or the LSA database 208 as shown in the example of FIG. 3) that the spectrum is now available. At 320, the incumbent NW equipment can use the spectrum that freed or vacated by the licensee.

This process can include, as the coverage areas of large cells 202A and small cells 202B can differ significantly, other small BSs 204B near the small cell 202B that leased the spectrum can use the spectrum transferred from a large cell 202A to a small cell 202B, such as for the given time or given geographic area, and for the given, leased spectrum band. The BSs that can benefit from can be, but need not be, a direct neighbor to the cell or corresponding BS that is leasing the spectrum. Other small cells 202B that are at least partially within the coverage of a large cell 202A can use the leased spectrum. Such a configuration can include communication between the LSA controller 206 and the affected cells or BSs and can include communication between the affected cells or BSs and the LSA database 208. This communication can help ensure that the LSA database 208 remains up to date with the current spectrum usage conditions of the cells in the network 200 so that the LSA controller 206 can perform an informed analysis.

In this context "transfer of spectrum" can include blocking bandwidth usage in the large cell 202A, and offering alternative bands in the small cell 202B instead. For example, in a dense small cell 202B environment (e.g., cell that includes multiple small cells 202B deployed therein) multiple small cells 202A can benefit from the transfer of spectrum, such as by using the leased spectrum. If a frequency band is blocked for a given large cell 202A, all small cells 202B that overlap geographically with the concerned large cell 202A can use this leased spectrum band. This can be helpful in a network that includes an ultra-dense deployment of small cells 202B. Therefore, spatially coordinated LSA activation of frequency bands in multiple small cells 202B is possible, such as when it is decided by the LSA controller 206 that spectrum can be transferred from one frequency layer (e.g., large cell 202A) to another (e.g., small cell 202B).

The large BS 204A (e.g., the NW equipment which is leasing spectrum to other NW equipment) can inform (e.g., directly or indirectly, such as through the LSA controller 206, inform) the LSA database 208 about the possibility of sharing spectrum, such as in a given geographic area, at a given time, or for a given spectrum band. If the communication is indirect, such as through the LSA controller 206, the LSA controller 206 can update the LSA database 208 accordingly. There can be a plurality of LSA databases 208 or a plurality of LSA controllers 206. The plurality of databases 208 or controllers 206 can be coordinated, such as to communicate with each other as needed. Such a set-up can be beneficial along regulatory boundaries (e.g., country borders), where cells of different Public Land Mobile Networks (PLMNs) can overlap, or when LSA spectrum can be made temporarily available (on at least one side of the border) for different MNOs to offer mobile services in different jurisdictions. The NW equipment that is requesting spectrum can access the LSA controller 206 to submit the request or can send the request to the LSA database 208, in which case the LSA database 208 can perform at least some of the functionality of the LSA controller 206. It is possible that the LSA controller 206 and LSA database 208 functionalities are included in a single physical entity. Also, an operator or regulator can directly feed or access information into or from the LSA database 208, such as information related to spectrum availability of a specific NW equipment, which may be able to provide spectrum to other cell types in a given geographic area, in a given spectrum band, or at a given time. The LSA controller 206 or the LSA database 208 can be implemented in already existing components (physical, software, firmware, or a combination thereof). The LSA controller 206 or the LSA database 208 can be included as a software feature in an existing network architecture in a single component or entity in the network or can be distributed over multiple components/entities.

Figure 4:
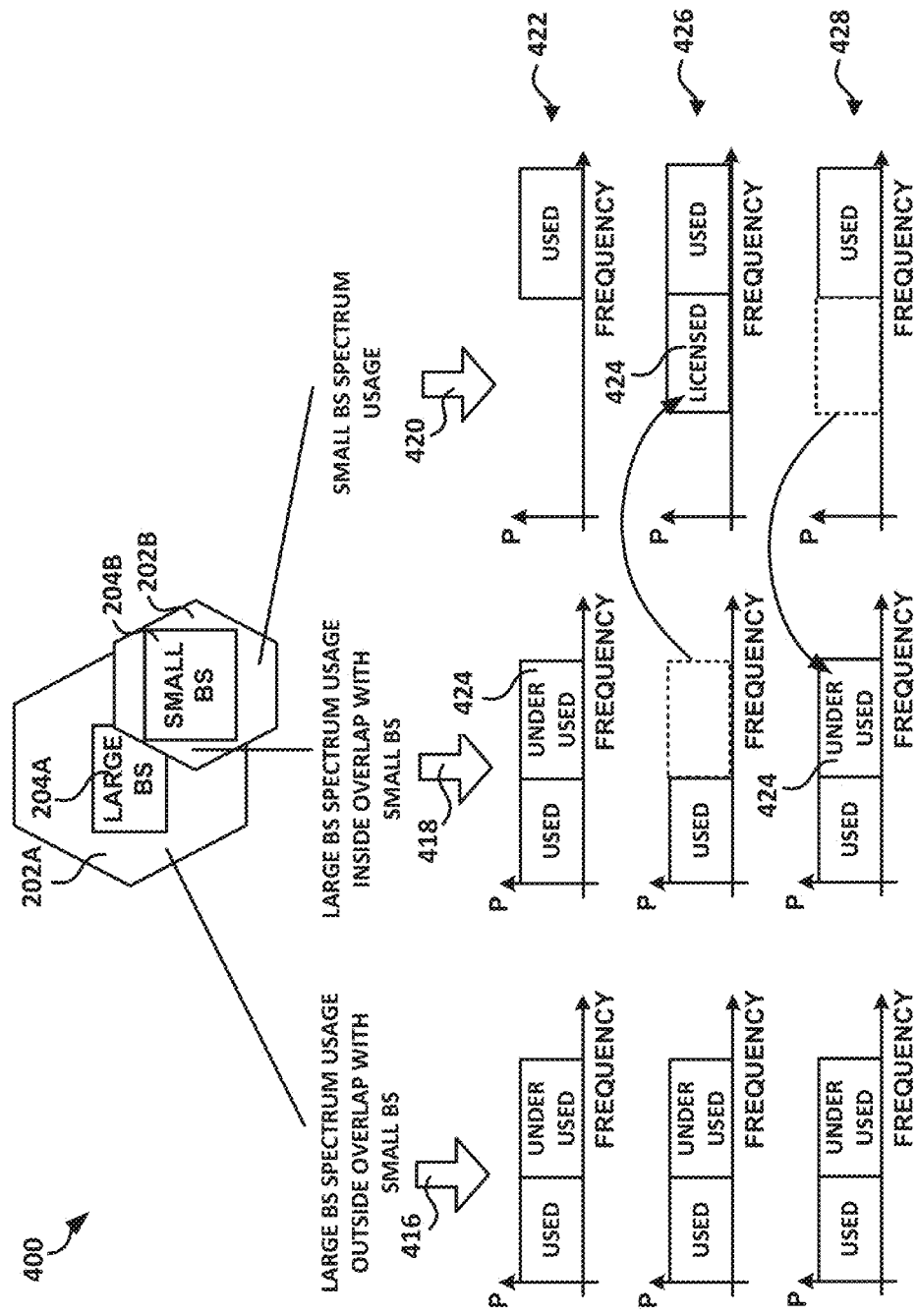
FIG. 4 shows an example of a sequence of handing over an under used frequency band.

FIG. 4 shows an example of a spectrum licensing scenario 400. The scenario 400 can include the large BS 204A, and small BS 204B with respective large cell 202A and small cell 202B coverage areas. The three power vs frequency graphs at 416 show examples of spectrum usage of the large BS 204A outside of a region where the large cell 202A and the small cell 202B overlap but within the large cell 202A. At the initial state 422, the licensing state 426, and the final state 428, a portion of the spectrum can be under used or used (FIG. 4 shows about half of the large BS 204A spectrum as under used). The initial state 422 can be the state of the spectrum before a portion of the spectrum is licensed. The licensed state 426 can be the state of the spectrum (e.g., the large BS 204A, small BS 204B, or other NW equipment spectrum) after licensing has begun and before the license has been vacated or terminated. The final state 428 can be the state of the spectrum after the license has been vacated or terminated.

The three power vs frequency graphs at 418 show examples of spectrum usage of the large BS 204A inside of a region where the large cell 202A and the small cell 202B overlap. At the initial state 422, the power spectrum usage inside the overlapping region can be the same as in the non-overlapping region, such as shown in the initial state 422 at 416. At the licensed state 426, the large BS 204A can license under used spectrum 424 to the small BS 204B. At the final state 428, the under used spectrum 424 can be vacated, freed, or licensed back to the large BS 204A.

The three power vs frequency graphs at 420 show examples of spectrum usage of the small BS 204A. At the initial state, the small BS 204B can have used spectrum and can benefit from additional spectrum to help satisfy the demands of the devices using the services of the small BS 204B. The small BS 204B can request some spectrum, such as from the LSA controller 206, the LSA database 208, the large BS 204A, or other NW equipment). In response to the request and at the licensed state 426, the small BS 204B can be licensed some spectrum from the large BS 204A, such as under used spectrum 424. At the final state 428, the small BS 204B can vacate or return the licensed spectrum 424 back to the incumbent (e.g., the large BS 204B in the example of FIG. 4).

Note that, while FIG. 4 shows the large BS 204A licensing spectrum only in the region where the large cell 202A and the small cell 202B overlap, the large BS 204A (or other incumbent) can stop using the licensed spectrum for the entirety of the relevant coverage area.

The previous disclosure explains how the licensing and vacating can be accomplished in terms of requests and responses. However, requests and responses need not be used. For example, one or more thresholds of traffic load or spectrum usage can be used to help automate the process of licensing spectrum.

In one or more embodiments, a threshold can be defined that indicates when a portion of spectrum is under used. When the traffic level on that portion of the spectrum goes below the threshold, the NW equipment that is experiencing the under usage can become a candidate for becoming a licensor (e.g., for licensing spectrum to other NW equipment). Another threshold can be defined that indicates when the traffic level on a portion of the spectrum is over used. When the traffic level on that portion of the spectrum meets or exceeds that threshold, the NW equipment (e.g., BS) that is experiencing the over usage can become a candidate spectrum licensee. The LSA controller 206, LSA database 208, or other NW equipment, can determine when the under usage and over usage thresholds are violated, such as simultaneously or for a predetermined amount of time, and automatically license the under used spectrum to the device that is experiencing the over usage. Communications between the LSA database 208, LSA controller 206, the large BS 202A, the small BS 202B, or other equipment, such as communication similar to that discussed with regard to FIG. 3, can be used to facilitate the licensing. The licensed spectrum can be vacated when the usage levels return to a steady state, after a predefined amount of time has elapsed, or after an over usage on the spectrum of the NW equipment licensor occurs.

LSA/ASA/CSS in general can be used in combination with 3GPP Carrier Aggregation (CA) features. In particular, LSA spectrum can be used jointly together with licensed spectrum as it is, duplexing mode included.

Figure 5A:
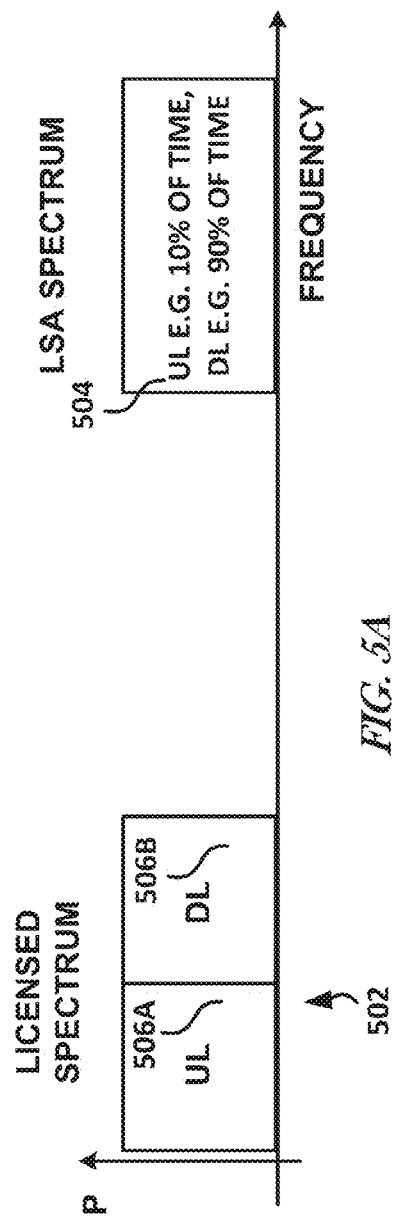
FIG. 5A shows an example of a graph of power versus frequency of a licensed spectrum and an LSA spectrum.

FIG. 5A shows an example of a licensed spectrum 502 and potential LSA spectrum 504 pm a power versus frequency graph. The licensed spectrum 502 can be duplexed using FDD, such as to perform a UL 506A using a first portion of the licensed spectrum 502 and perform a DL 506B using a second portion of the licensed spectrum 502 different from the first portion of the licensed spectrum 502. The licensed spectrum 502 can be LTE or 3GPP licensed spectrum. The LSA spectrum 504 can be duplexed using TDD, such that at one time the LSA spectrum 504 can be used for DL and another point in time the LSA spectrum 504 can be used for UL. The LSA spectrum can be LTE TDD in the 2.3 GHz to 2.4 GHz band or other frequency band. In the example shown in FIG. 5A, the LSA spectrum 504 is performing UL about ten percent of the time and performing DL about ninety percent of the time. It can be advantageous to simultaneously operate LTE FDD (typical licensed LTE frequency bands, such as shown in FIGS. 5A and 5B) and LTE TDD (typical LSA frequency band, such as shown in FIG. 5B).

In one or more embodiments, LTE TDD spectrum (e.g., LSA spectrum 504 in the example of FIGS. 5A and 5B) usage can be configured such that UL/DL parts of the TDD band are adapted to the need of the target licensee. The UL/DL parts can be asymmetric (e.g., more resources can be allocated to UL compared to DL, or vice versa). A corresponding example is illustrated in FIG. 5A.

Figure 5B:
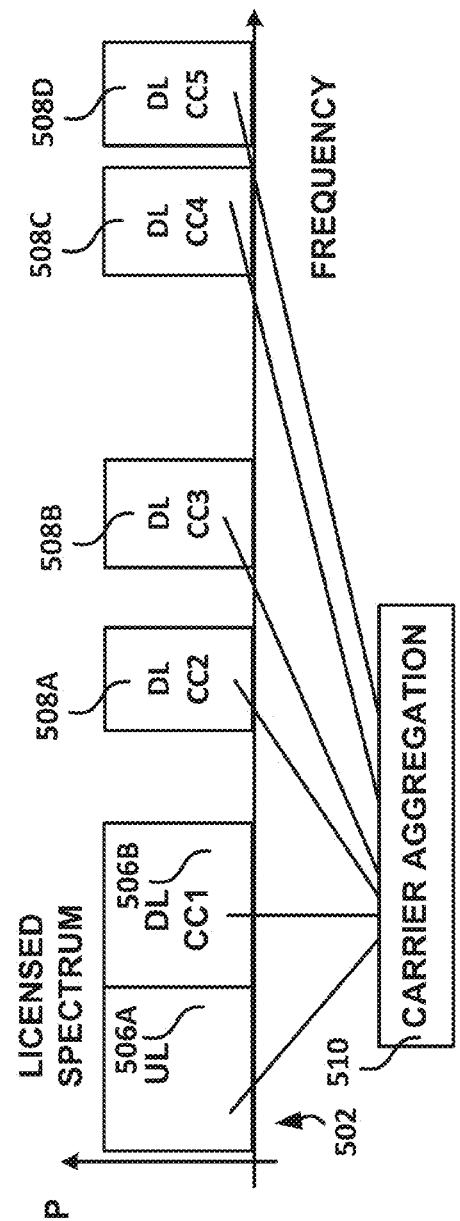
FIG. 5B shows an example of a graph of power versus frequency that indicates how to use Carrier Aggregation (CA) to account for relative UL and DL times in a given frequency band or spectrum.

In a situation where the LSA spectrum 504 is released (e.g., the LSA licensing/leasing contract ends and the LSA spectrum 504 is given back to the incumbent), the licensee can use CA of non-LSA bands (typically, other licensed spectrum bands) in order to make up for the loss of LSA spectrum 504 bandwidth, such as shown in FIG. 5B. In case of asymmetric UL/DL allocation for the LSA spectrum 504, CA can be performed in the licensed band with a selective choice of UL/DL channels (e.g., component carriers DL Control Channel (CC) 508A, 508B, 508C, or 508D, such as shown in FIG. 5B). In order to achieve the same UL/DL capacity in the licensed bands, the number of UL CC and DL CC can be configured such that the previous LSA UL and DL capacity is approximately met. The basic principle is illustrated in FIG. 5B showing a supplement of four additional DL CCs for the ninety percent DL of the LSA spectrum 504 of FIG. 5A. Such a configuration can account for asymmetric traffic in a given cell or coverage area.

Figure 6:
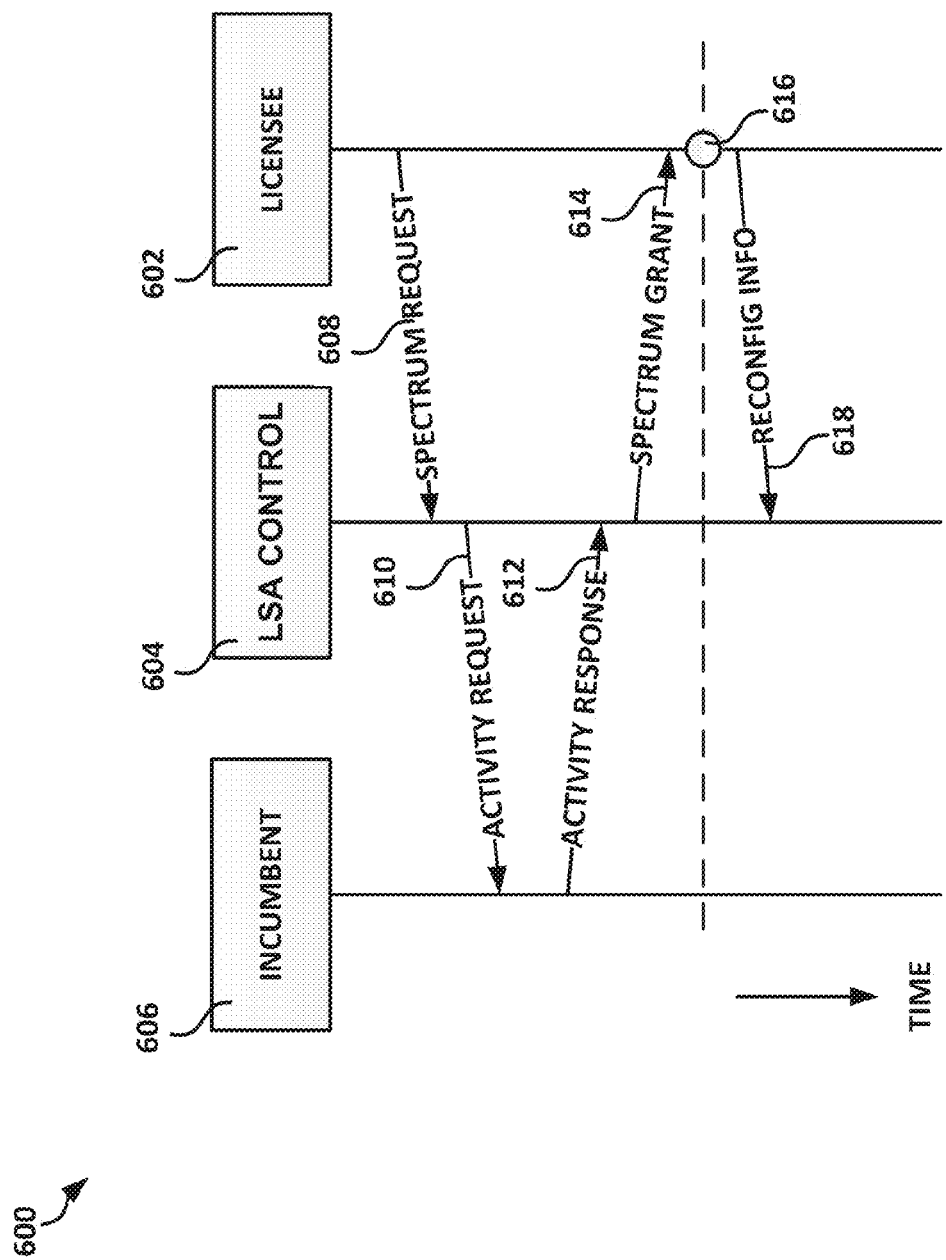
FIG. 6 shows an example of a communication protocol for performing a frequency allocation.

FIG. 6 shows an example of a message sequence diagram 600 between a licensee 602 (e.g., NW equipment, such as the large BS 204A, the small BS 204B, or other NW access equipment), the LSA control 604, and an incumbent 606 (e.g., NW equipment, such as the large BS 204A, the small BS 204B, or other NW access equipment) that can be used to request spectrum in the LSA band(s). The licensee 602 can be the MNO that is currently in search of more bandwidth (e.g., spectrum). The LSA control 604 entity can include the LSA controller 206 or the LSA database 208. The incumbent 606 may be a service operated by the government or by any authorized service provider (such as a notified body or similar) in an LSA band.

Note that the messages "ACTIVITY REQUEST" and "ACTIVITY RESPONSE" in FIG. 6 may not be standardized and may occur in the background. In one or more embodiments, the incumbent 606 can provide a list of available bands that are open for sharing, such as before the licensee 602 sends the "SPECTRUM REQUEST" message, at 608. The LSA control 604 can select a sharing band among the ones provided by the incumbent 606, such as for lease or licensing. At 610, the LSA control 604 can transmit an "ACTIVITY REQUEST" to the incumbent 606, such as to identify the bandwidth, time, location, or other details regarding the spectrum requested at 608. At 612, the incumbent 606 can respond to the "ACTIVITY REQUEST" using an "ACTIVITY RESPONSE". The "ACTIVITY RESPONSE" can be an ACKnowledge (ACK) or a Negative ACKnowledge (NACK) (e.g., denial) of the "ACTIVITY REQUEST". At 614, the LSA control 604 can transmit a "SPECTRUM GRANT" to the licensee 602, such if the incumbent 606 approved of the details of the "ACTIVITY REQUEST" or "SPECTRUM REQUEST". At 616, a handover of the licensed spectrum from the incumbent 606 to the licensee 602 can occur. At 618, "RECONFIGURATION INFORMATION" can be transmitted from the licensee 602 to the LSA control 604.

The "SPECTRUM REQUEST" can include one or more of the information elements shown in the table 700 in FIG. 7. The preferred carrier frequency information element of FIG. 7 can include a high carrier frequency for small cells (e.g., femto cells, pico cells, or micro cells), such as can be due to higher attenuation of higher frequency carriers, or low carrier frequency for larger cells (e.g., macro cells), such as can be due to the lower attenuation for low carrier frequencies. The cellular network configuration information element can include CA settings, duplex mode information, or an identifier pointing to one of a set of predefined or default configurations in the respective location. The area information element can include an area code, Global Positioning System (GPS) coordinates, longitude or latitude coordinates, Global Navigation Satellite System (GNSS) coordinates, a list of BSs, or the like.

The "SPECTRUM GRANT" can include one or more of the information elements shown in the table 800 in FIG. 8.

Figure 9:
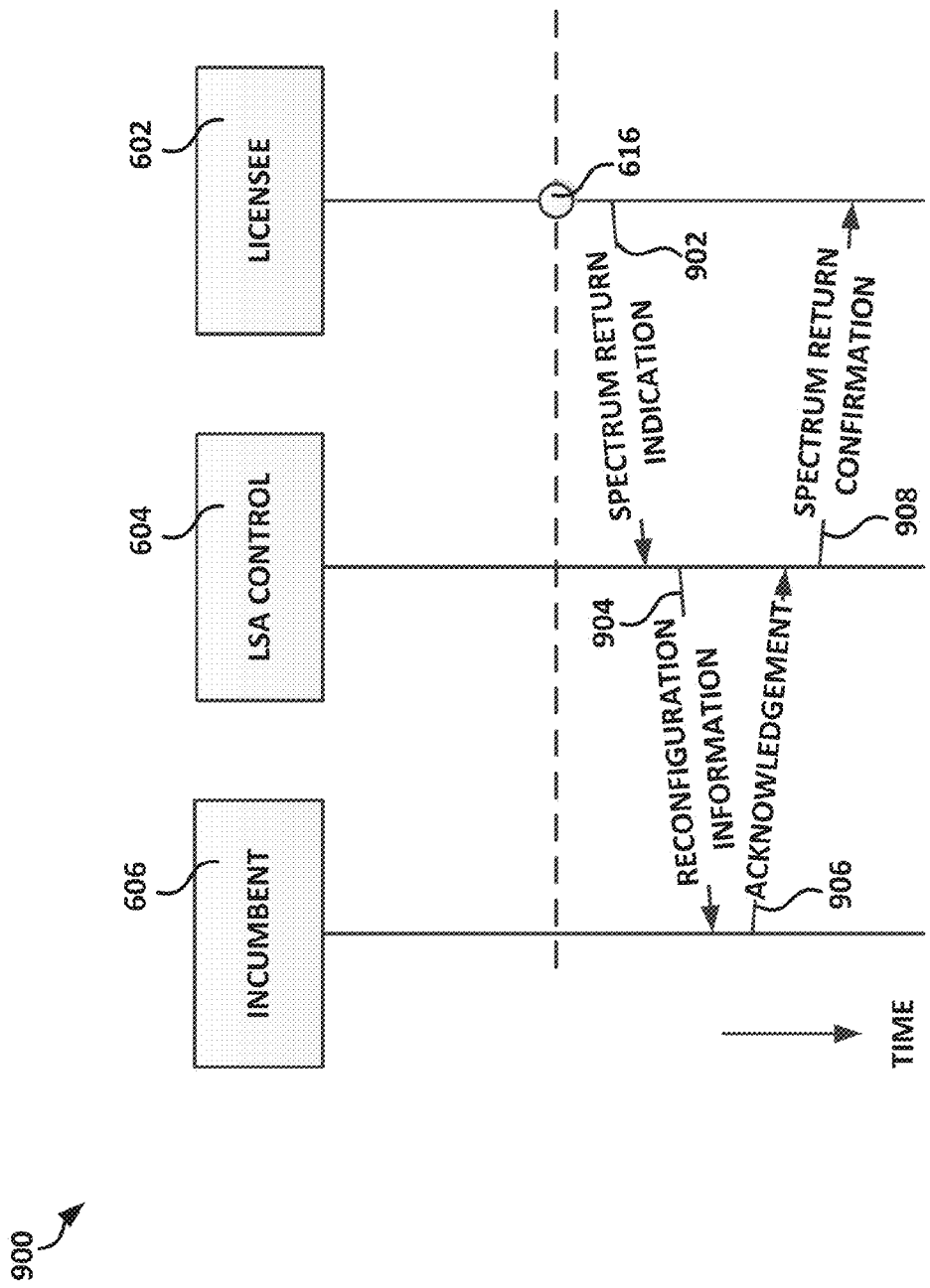
FIG. 9 shows an example of a communication protocol for performing a frequency vacation or grant back.

FIG. 9 shows a message sequence diagram 900 between the licensee 602, the LSA control 604, and the incumbent 606 that can occur at or around the time spectrum in the LSA band(s) is freed or otherwise vacated. In the example of FIG. 9 the licensee 602 may be the MNO that is returning licensed spectrum. At 902, such as after the handover 616 has completed, a "SPECTRUM RETURN INDICATION" can be transmitted from the licensee 602 to the LSA control 604. At 604, the LSA control 604 can transmit "RECONFIGURATION INFORMATION" to the incumbent, such as to inform the incumbent 606 that the spectrum is being returned. At 906, the incumbent 606 can ACK or NACK the "RECONFIGURATION INFORMATION" from the LSA control 604. At 908, the LSA control 604 can transmit "SPECTRUM RETURN CONFIRMATION" to the licensee 602, such as to confirm or deny that the licensee 602 should free or release the spectrum back to the incumbent 606.

Note that the messages "RECONFIGURATION INFORMATION" and "ACKNOWLEDGEMENT" in FIG. 9 may not be standardized and may occur in the background. In one or more embodiments, the LSA control 604 can perform various spectrum release procedures (e.g., it handles multiple "SPECTRUM RETURN INDICATION" messages at a time) consecutively or in parallel, such as before the incumbent 606 is notified about this release operation. In one or more embodiments, the incumbent can be informed about successful release of its LSA resources at a later point in time (e.g., after the "SPECTRUM RETURN CONFIRMATION" message is sent), for instance by means of a consolidated "RECONFIGURATION INFORMATION" message (not shown in FIG. 9).

The "SPECTRUM RETURN INDICATION" can include one or more of the information elements shown in the table 1000 in FIG. 10. The reconfiguration identifier information element from the "SPECTRUM GRANT" can be included with the reconfiguration identifier of the "SPECTRUM RETURN INDICATION" reconfiguration identifier, such as if the reconfiguration (e.g., entire reconfiguration) is accepted by the licensee 602. The area information element can include data in a form substantially similar to the area information element of the "SPECTRUM REQUEST".

The "SPECTRUM RETURN CONFIRMATION" can include one or more of the information elements shown in the table 1100 in FIG. 11.

The order of the information elements in the FIGS. 7, 8, 10, and 11 is arbitrary. Not all information elements need to be present in every instance of a message. Also, the information elements can appear inside a container or outside the container.

The "SPECTRUM REQUEST" message in FIG. 6 and the "SPECTRUM RETURN INDICATION" message in FIG. 9 can be triggered by the licensee 602. However, there may be cases in which the incumbent 606 (or the LSA control 604, such as the LSA control 604 acting on behalf of the incumbent 606) can take on the initiative for either requesting spectrum or releasing spectrum. This is not shown in the FIGS. 6 and 9 for sake of brevity. When the incumbent 606 (or the LSA control 604) triggers the spectrum request procedure, the incumbent 606 (or the LSA control 604) may offer or advertise that spectrum is available in the LSA band(s) to various potential licensees 602, such as in a communication to the licensee 602. The incumbent 606 (or LSA control 604) can take back or seize licensed spectrum from various licensees (e.g., in case of emergency), such as when the incumbent 606 (or LSA control 604) triggers the spectrum release procedure or in a licensing scenario where the licensee 602 requests the spectrum.

In a 3GPP HetNet intra-operator context, the LSA Control 604 can have different features as compared to other LSA applications (e.g., 2.3-2.4 GHz case as discussed by ETSI/CEPT). The LSA approach discussed herein is more than a simple application of classical LSA in an inter-operator or intra-operator cellular network context. Differences are discussed generally throughout this disclosure and can include the LSA database 208 buffering spectrum usage information (e.g., information on future usage of spectrum-resources over time, space, or band) of cells which are capable of leasing or licensing spectrum to other cells or other cell types. This spectrum usage information may be provided by small cells 202B or large cells 202A or other types of cells. In cellular networks, the bands available to any given small cell 202B or large cell 202A can be derived in a static (or quasi-static) way during the cell planning stage. This type of information can be included in the LSA database 208 and can be directly obtained following the cell planning stage.

The cells leasing spectrum to others can provide further information on the actual expected future usage of the resources assigned to them during the cell planning stage. While the allocated spectrum per cell can be fixed during the cell planning stage, the actual usage level can be observed by the cell itself. Cells that are available to lease spectrum to other cells can be wired or wirelessly connected to the LSA database 208 (to be more specific, the BS of the concerned cell can be connected to the LSA database 208).

The LSA database 208 information can be provided to a cell that is not directly connected to the LSA database 208. The information can be provided through a cell that is directly connected to the LSA database 208 and one or more "hops" across different BSs may be required to get the LSA database 208 information to the cell. Larger cells can lease spectrum to smaller cells, (e.g., a macro cell can lease or license spectrum to a small-, femto-, pico-, or micro-cell). If a number of neighbouring smaller cells are able to lease spectrum to other cells, then smaller cells can lease spectrum to larger cells. For example, if (a cluster of) considered candidate femto cells substantially fully cover a pico-, micro- or macro cell, the femto cell can lease or license spectrum to the respective pico-, micro-, or macro-cell. The same could happen for pico cells that substantially fully cover a micro- or macro cell or a micro cell substantially covers the coverage area of a macro cell, the pico or micro cell can lease spectrum to the micro- or macro-cell. In the same sense, leasing is possible between cells of the same size. For example, if a number of micro cells overlap with another micro cell and the micro cells can transfer spectrum to the target micro cell for a given location, a given time, or a given band.

The LSA control 604 can provide an interface that is tailored to cellular network needs, such as in the following ways: (1) indicating whether the cell planning procedure has granted the possibility for a given cell to lease spectrum to other cells and/or whether a given cell can request more spectrum on a leasing basis from other cells; (2) indicating preferred cell types from which spectrum can be leased (e.g., a femto BS can indicate that leased spectrum can come from an overlapping pico-, micro- or macro-cell (or multiple of such cells). Also, leasing cells can provide preferred target cell leasing types (e.g., a macro cell can state that it preferably transfers spectrum to overlapping micro cells for a given location, time, or band. The micro cell could then license the transferred spectrum to another cell, such as a femto or pico cell.); (3) frequency re-usage constraints can be provided to the target cells which can use the spectrum which they have leased from other cell types; (4) a central controller (for example the cell planner) can modify/correct any leasing decision within the network. This modification can be done manually, quasi-manually by providing corresponding inputs to a database, or automatically (i.e. without human interference).

The ability of a cell to lease spectrum to another cell can be derived centrally (for example, during the cell planning process the possibility for spectrum sharing can be activated or deactivated) as well as locally (for example, depending on the cell usage statistics, a considered cell may decide autonomously whether it can lease the spectrum to larger cells). Both decision mechanisms can be combined in a rather straightforward manner: If a "spectrum sharing flag" is activated for a given cell, the cell can check whether spectrum sharing is appropriate. If it is appropriate, the cell can indicate the corresponding spectrum availability for a given location, time, or band to the LSA database 208 (either directly or indirectly, such as through another BS to the LSA database 208).

The need for leasing spectrum from other cells (overlapping with the target cell) can also be identified on a local (e.g., executed by a given BS) or on a global level (e.g., executed in a central node accessing one or more of the BSs of the network). A "global decision making" process may identify that spectrum should be moved, for example, from larger cells, such as macro cells, to smaller cells, such as micro-, pico-, or femto-cells. If the same spectrum is available to smaller cells, there can be fewer users (e.g., devices or UEs) per cell as compared to the number of users in per large cell who may share the target bandwidth. Therefore, the capacity per user can be increased.

If an operator controls other spectrum than its cellular spectrum, for example WiFi in an operator deployed case, the spectrum leasing (e.g., licensing) may be used for transferring spectrum from one system (for example WiFi) to another system (for example LTE) in a given location, a given time, or a given band.

Figure 12:
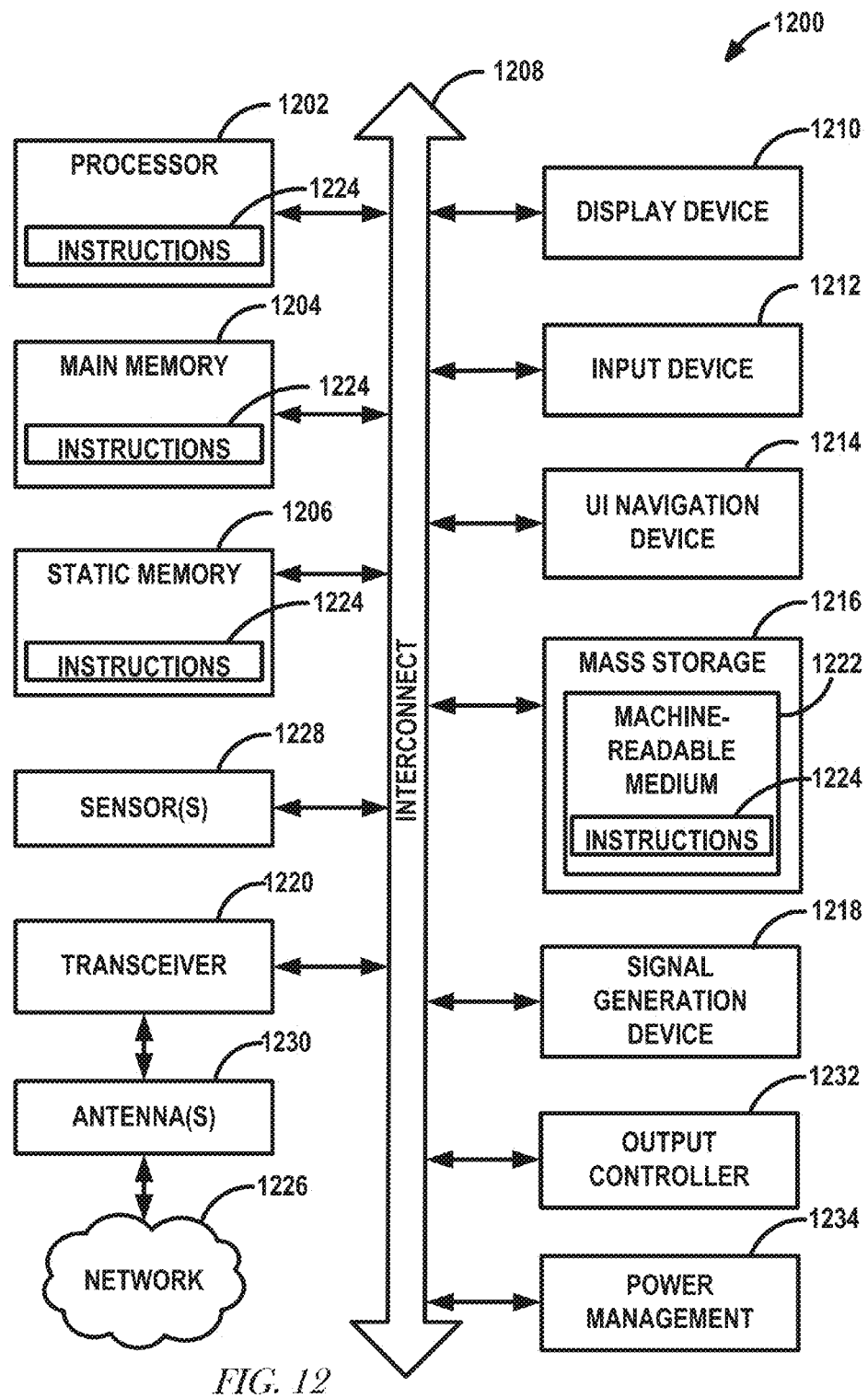
FIG. 12 shows a block diagram of an example of a machine upon which any of one or more techniques (e.g., methods) discussed herein may be performed.

FIG. 12 illustrates a block diagram of an example machine 1200 upon which any one or more of the techniques (e.g., methodologies) discussed herein may perform. In alternative embodiments, the machine 1200 may operate as a standalone device or may be connected (e.g., networked) to other machines. In a networked deployment, the machine 1200 may operate in the capacity of a server machine, a client machine, or both in server-client network environments. In an example, the machine 1200 may act as a peer machine in peer-to-peer (P2P) (or other distributed) network environment. The machine 1200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 1200 may include a hardware processor 1202 (e.g., a central processing unit (CPU), a graphics processing unit (GPU), a hardware processor core, or any combination thereof), a main memory 1204 and a static memory 1206, some or all of which may communicate with each other via an interlink (e.g., bus) 1208. The machine 1200 may further include a display unit 1210, an alphanumeric input device 1212 (e.g., a keyboard), and a user interface (UI) navigation device 1214 (e.g., a mouse). In an example, the display unit 1210, input device 1212 and UI navigation device 1214 may be a touch screen display. The machine 1200 may additionally include a storage device (e.g., drive unit) 1216, a signal generation device 1218 (e.g., a speaker), a network interface device 1220, and one or more sensors 1221, such as a global positioning system (GPS) sensor, compass, accelerometer, or other sensor. The machine 1200 may include an output controller 1228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1216 may include a machine readable medium 1222 on which is stored one or more sets of data structures or instructions 1224 (e.g., software) embodying or utilized by any one or more of the techniques or functions described herein. The instructions 1224 may also reside, completely or at least partially, within the main memory 1204, within static memory 1206, or within the hardware processor 1202 during execution thereof by the machine 1200. In an example, one or any combination of the hardware processor 1202, the main memory 1204, the static memory 1206, or the storage device 1216 may constitute machine readable media.

While the machine readable medium 1222 is illustrated as a single medium, the term "machine readable medium" may include a single medium or multiple media (e.g., a centralized or distributed database, and/or associated caches and servers) configured to store the one or more instructions 1224.

The term "machine readable medium" may include any medium that is capable of storing, encoding, or carrying instructions for execution by the machine 1200 and that cause the machine 1200 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1224 may further be transmitted or received over a communications network 1226 using a transmission medium via the network interface device 1220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1220 may include one or more physical jacks (e.g., Ethernet, coaxial, or phone jacks) or one or more antennas to connect to the communications network 1226. In an example, the network interface device 1220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1200, and includes digital or analog communications signals or other intangible medium to facilitate communication of such software.

As used herein, a HetNet can be a cellular network system (e.g., 3GPP system) using multiple different cell types, such as macro, micro, femto, or pico cells. Some or all of the applied cell types may or may not be (partially or fully) overlapping in time, space, or frequency. A HetNet can also be a cellular network combined with other non-cellular technology networks such as WiFi (IEEE 802.11a/b/g/n/ac/ad), WiFi for TVWS (IEEE 802.11af), mmWave systems, or the like. Some or all of the coverage areas or cells of the technologies in the HetNet may or may not be (partially or fully) overlapping in time, space, or frequency.

Wired communications may include serial and parallel wired mediums, such as Ethernet, Universal Serial Bus (USB), Firewire, Digital Visual Interface (DVI), High-Definition Multimedia Interface (HDMI), etc. Wireless communications may include, for example, close-proximity wireless mediums (e.g., Radio Frequency (RF), such as based on the Near Field Communications (NFC) standard, InfraRed (IR), Optical Character Recognition (OCR), magnetic character sensing, or the like), short-range wireless mediums (e.g., Bluetooth, WLAN, Wi-Fi, etc.), long range wireless mediums (e.g., cellular wide area radio communication technology that may include, for example, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g., UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA UMTS (Wideband Code Division Multiple Access Universal Mobile Telecommunications System), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard), electronic interaction via sound waves, IEEE 802.11a/b/g/n/ac/ad/af, WiFi, WiFi for TVWS, IEEE 802.16e/m, WiMAX, or the like.

Additional Notes

The above Description of Embodiments includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The functions or techniques described herein may be implemented in software or a combination of software and human implemented procedures. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Embodiments as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A License Shared Access (LSA) controller in a Heterogeneous cellular Network (HetNet) comprising:
   a processor configured to determine which licensing option of a plurality of licensing options to accept; and
   a transceiver configured to:
   receive, from a licensee enhanced node B (eNodeB), a first signal representative of a request for extra spectrum, wherein the licensee eNodeB provides communications within a first coverage area; and
   transmit a second signal representative of one or more details of the accepted licensing option to both the licensee eNodeB and a plurality of licensor eNodeBs so as to cause the licensee eNodeB to use the extra spectrum and cause the licensor eNodeBs to stop using the extra spectrum in the first coverage area, wherein the extra spectrum is from the plurality of licensor eNodeBs, the licensor eNodeBs comprise a plurality of eNodeBs within the first coverage area, and wherein second, respective coverage areas of the licensor eNodeBs combine to completely cover the first coverage area, wherein the respective second coverage areas are smaller than the first coverage area.

2. The LSA control of claim 1, wherein the transceiver is further configured to:
receive a third signal indicating that the licensee eNodeB is going to return the extra spectrum to the licensor eNodeBs; and
transmit a fourth signal to the licensor eNodeBs that indicates that the licensee eNodeB is going to return the extra spectrum.

3. The LSA control of claim 2, wherein the first signal indicates a location and time the licensee eNodeB is going to use the extra spectrum requested.

4. The LSA control of claim 3, wherein the first signal indicates a preferred frequency band for the extra spectrum.

5. The LSA control of claim 4, further comprising an LSA database that includes data representative of the plurality of licensing options and wherein the processor is configured to access the LSA database to retrieve the plurality of licensing options.

6. The LSA control of claim 5, wherein the LSA database further includes data representative of traffic load levels on the licensee eNodeB and the licensor eNodeBs.

7. A licensee enhanced node B (eNodeB) comprising:
a transceiver configured to:
transmit a request to use a frequency band that the licensee eNodeB does not currently use;
receive, from a License Shared Access (LSA) controller, an acceptance or acceptable reconfiguration of the transmitted request, and communicate with devices within a first coverage area of the licensee eNodeB using spectrum from a plurality of licensor eNodeBs, with wherein second respective coverage areas of the licensor eNodeBs combine to completely cover the first coverage area, wherein the second, respective coverage areas are smaller than the first coverage area.

8. The licensee eNodeB of claim 7, wherein the request includes an indication of a time and a location in which the licensee eNodeB will use the frequency band.

9. The licensee eNodeB of claim 8, wherein the transceiver is configured to transmit an acceptance or rejection of the acceptable reconfiguration to the LSA control, in response to receiving the acceptable reconfiguration.

10. The licensee eNodeB of claim 8, wherein the transceiver is configured to transmit an indication that the frequency band is no longer being used to the LSA control, in response to the time expiring and configured to perform a handover of traffic on the licensed spectrum.

11. A method of using spectrum from a License Shared Access (LSA) band in a cellular network comprising:
using leased spectrum to communicate with devices within a coverage area;
releasing the leased spectrum back to a license enhanced node B (eNodeB);
determining a percentage of uplink time and downlink time usage of the leased spectrum;
using carrier aggregation to allow a resource of the cellular network access to another frequency band;
if the percentage of uplink time is greater than the percentage of downlink time, then accessing more uplink carrier channels than downlink carrier channels using the carrier aggregation; and
if the percentage of downlink time is greater than the percentage of uplink time, then accessing more downlink carrier channels than uplink carrier channels using the carrier aggregation.

12. The method of claim 11, wherein the cellular network is a Long Term Evolution (LTE) network that used frequency domain duplexing and the LSA band uses time domain duplexing.

13. The method of claim 12, wherein the LSA band is in the 3550 MHz to 3650 MHz or 2.3 GHz to 2.4 GHz range.

14. A non-transitory machine readable medium including instructions stored thereon, the instructions, which when executed by a machine, cause the machine to perform operations comprising:
receiving a first signal representative of a request for extra spectrum from a licensee enhanced node B (eNodeB), wherein the licensee eNodeB includes a first coverage area;
determining that respective, second coverage areas of the licensor eNodeBs completely cover the first coverage area;
providing the licensee eNodeB with a plurality of licensing options;
receiving a signal representative of an option of the plurality of licensing option from the licensee eNodeB; and
transmitting a second signal representative of one or more details of the accepted licensing option to the licensee eNodeB and a plurality of licensor eNodeBs so as to cause the licensee eNodeB to use the extra spectrum and cause the licensor eNodeBs to stop using the extra spectrum in the first coverage area.

15. The medium of claim 14, wherein the medium further comprises instructions stored thereon, which when executed by the machine, cause the machine to perform operations comprising:
receiving a third signal indicating that the licensee eNodeB is going to return the extra spectrum to the licensor eNodeBs; and
transmitting a fourth signal to the licensor eNodeBs that indicates that the licensee eNodeB is going to return the extra spectrum.

16. The medium of claim 15, wherein the instructions for receiving the first signal include instructions for receiving the first signal wherein the first signal indicates a location and time the licensee eNodeB is going to use the extra spectrum requested.

17. The medium of claim 16, wherein the instructions for receiving the first signal include instructions for receiving the first signal wherein the first signal indicates a preferred frequency band for the extra spectrum.

18. The medium of claim 17, further comprising instructions, which when executed by the machine, cause the machine to perform operations comprising retrieving the plurality of licensing options from an LSA database.

19. The medium of claim 18, further comprising instructions, which when executed by the machine, cause the machine to perform operations comprising accessing data representative of traffic load levels on the licensee eNodeB and the licensor eNodeBs.

* * * * *